Figure 1:
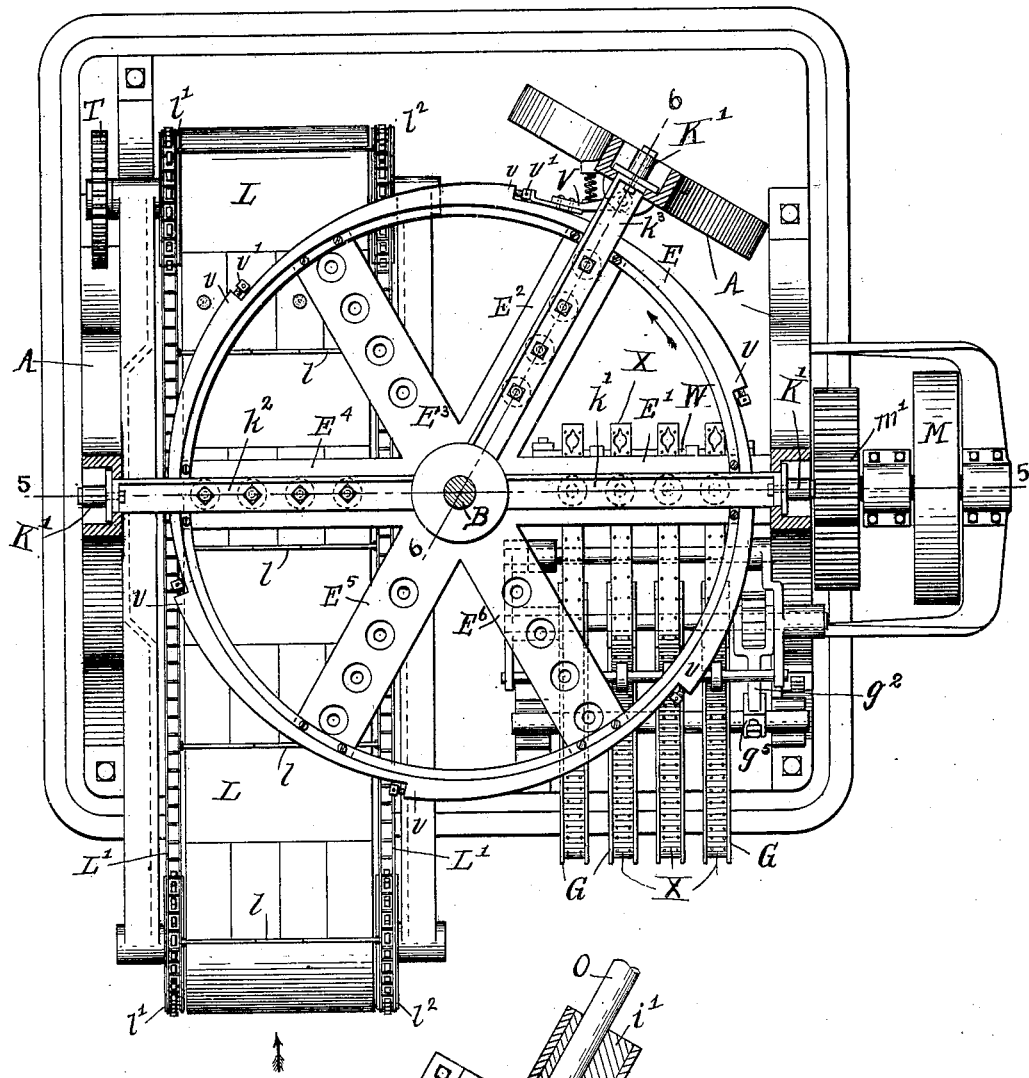

No. 897,001. PATENTED AUG. 25, 1908.
W. E. MARTIN.
MACHINE FOR MAKING TAGS AND AUTOMATICALLY ATTACHING THEM TO PLUGS OF TOBACCO.
APPLICATION FILED AUG. 19, 1903.

7 SHEETS—SHEET 1.

WITNESSES:—
Ernest Pulsford.
S. H. Finning

INVENTOR:—
W. E. Martin.
BY
Baldwin Davidson & Wright
HIS ATTORNEYS.

No. 897,001. PATENTED AUG. 25, 1908.
W. E. MARTIN.
MACHINE FOR MAKING TAGS AND AUTOMATICALLY ATTACHING THEM TO PLUGS OF TOBACCO.
APPLICATION FILED AUG. 19, 1903.

7 SHEETS—SHEET 2.

WITNESSES:—

INVENTOR:—
W. E. Martin.
BY
HIS ATTORNEYS.

No. 897,001. PATENTED AUG. 25, 1908.
W. E. MARTIN.
MACHINE FOR MAKING TAGS AND AUTOMATICALLY ATTACHING THEM
TO PLUGS OF TOBACCO.
APPLICATION FILED AUG. 19, 1903.

7 SHEETS—SHEET 3.

WITNESSES:—
Ernest Pulsford.

INVENTOR:—
W. E. Martin.
BY
Baldwin Davidson & Wright
HIS ATTORNEYS.

No. 897,001. PATENTED AUG. 25, 1908.
W. E. MARTIN.
MACHINE FOR MAKING TAGS AND AUTOMATICALLY ATTACHING THEM TO PLUGS OF TOBACCO.
APPLICATION FILED AUG. 19, 1903.

7 SHEETS—SHEET 4.

WITNESSES:-

INVENTOR:-
W. E. Martin.
BY
HIS ATTORNEYS.

No. 897,001. PATENTED AUG. 25, 1908.
W. E. MARTIN.
MACHINE FOR MAKING TAGS AND AUTOMATICALLY ATTACHING THEM
TO PLUGS OF TOBACCO.
APPLICATION FILED AUG. 19, 1903.

7 SHEETS—SHEET 5.

WITNESSES:-

INVENTOR:-
W. E. Martin.
BY
HIS ATTORNEYS.

No. 897,001.  
W. E. MARTIN.  
MACHINE FOR MAKING TAGS AND AUTOMATICALLY ATTACHING THEM TO PLUGS OF TOBACCO.  
APPLICATION FILED AUG. 19, 1903.

PATENTED AUG. 25, 1908.

7 SHEETS—SHEET 6.

WITNESSES:-

INVENTOR:-
W. E. Martin.
BY
His ATTORNEYS.

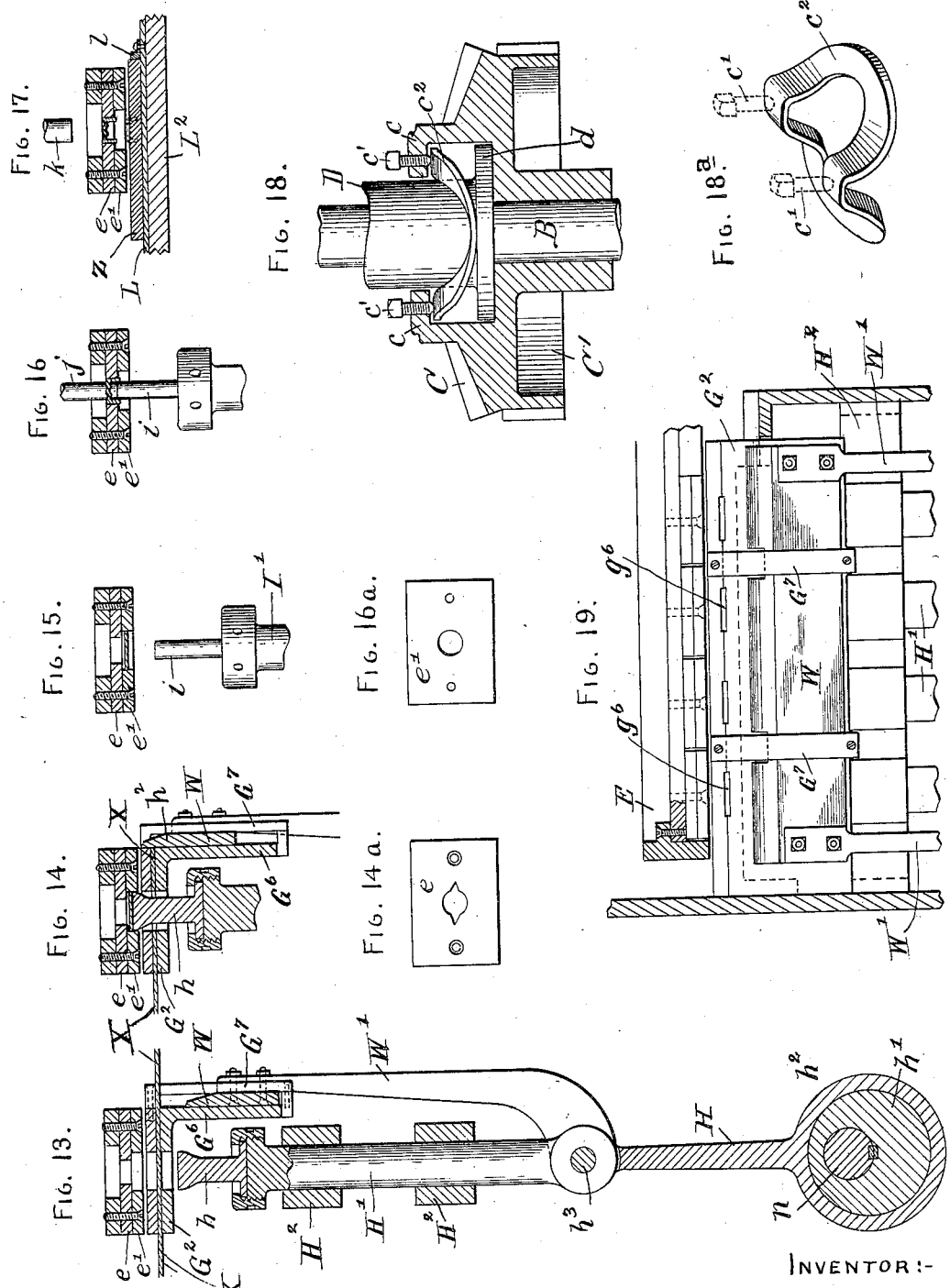

UNITED STATES PATENT OFFICE.

WHITLEY E. MARTIN, OF WINSTON SALEM, NORTH CAROLINA, ASSIGNOR OF ONE-FIFTH TO GEORGE MASLIN DAVIS, OF WINSTON SALEM, NORTH CAROLINA, AND ONE-THIRTIETH TO EDGAR J. DAVIS, OF GREENSBORO, NORTH CAROLINA.

MACHINE FOR MAKING TAGS AND AUTOMATICALLY ATTACHING THEM TO PLUGS OF TOBACCO.

No. 897,001.          Specification of Letters Patent.         Patented Aug. 25, 1908.

Application filed August 19, 1903. Serial No. 170,085.

*To all whom it may concern:*

Be it known that I, WHITLEY E. MARTIN, a citizen of the United States, residing at Winston Salem, in the county of Forsyth and State of North Carolina, have invented certain new and useful Improvements in Machines for Making Tags and Automatically Attaching Them to Plugs of Tobacco, of which the following is a specification.

The object of my invention is to provide an improved automatic machine for cutting out tags from appropriate strips and attaching them to plugs of tobacco.

In carrying out my invention, I draw from reels strips of metal each containing a series of tag blanks arranged uniform distances apart. These strips are fed to devices which punch the tags from them and these tags are carried over plugs of tobacco to which the tags are applied. The tag strips are provided with longitudinal perforations which are engaged by sprocket wheels that feed the strips with absolute accuracy to the devices which punch out the tag blanks. A cutter is employed to sever the scrap metal from the strips after the formation of the tags, then the tags thus punched out are received by a rotary carrier which conveys the tag blanks to another set of punches which bend the spurs on the tags, causing them to assume positions at right angles to the plane of the tag body and in this condition the tags are conveyed by the carrier to a position below punches or plungers which press the tags into the tobacco. While the spurs are being bent on the tags the tags may be embossed by other punching devices. The rotary carrier is arranged horizontally and is advanced step by step at regular intervals. In order that the carrier may be stopped in the proper positions to receive the punches, I have devised means whereby it is caused to at first move beyond the proper positions and then move back a few degrees and stop positively and accurately with the die openings in exact alinement with the punches.

The details of construction will be hereinafter more fully described.

The accompanying drawings show my improvements as embodied in the best form now known to me. Obviously, some of the devices shown may be used without the others and in machines differing somewhat in their organization and operation from that of the machine herein described and illustrated. The feed end of the machine I term the front and the opposite end the rear.

Figure 7:
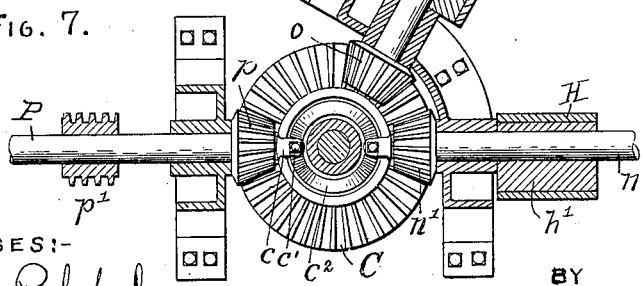
Figure 2:
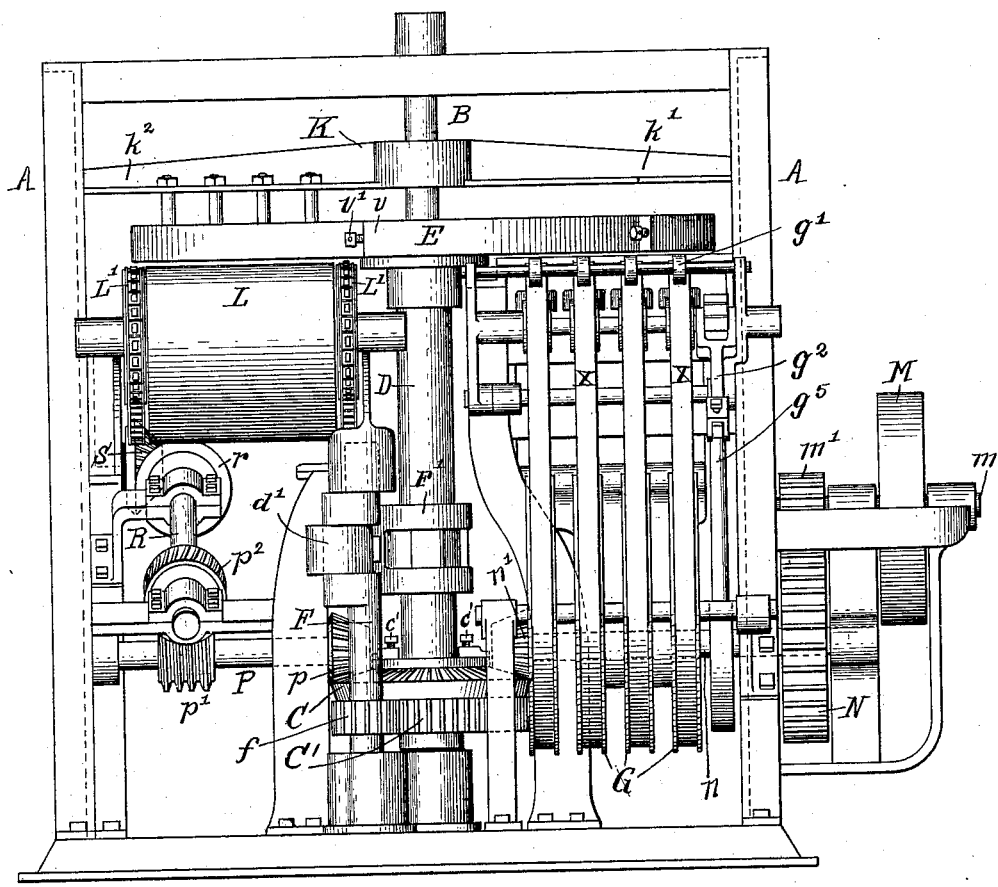
Figure 8:
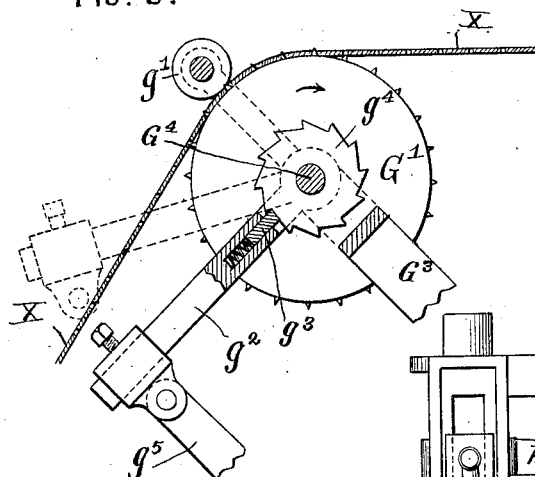
Figure 3:
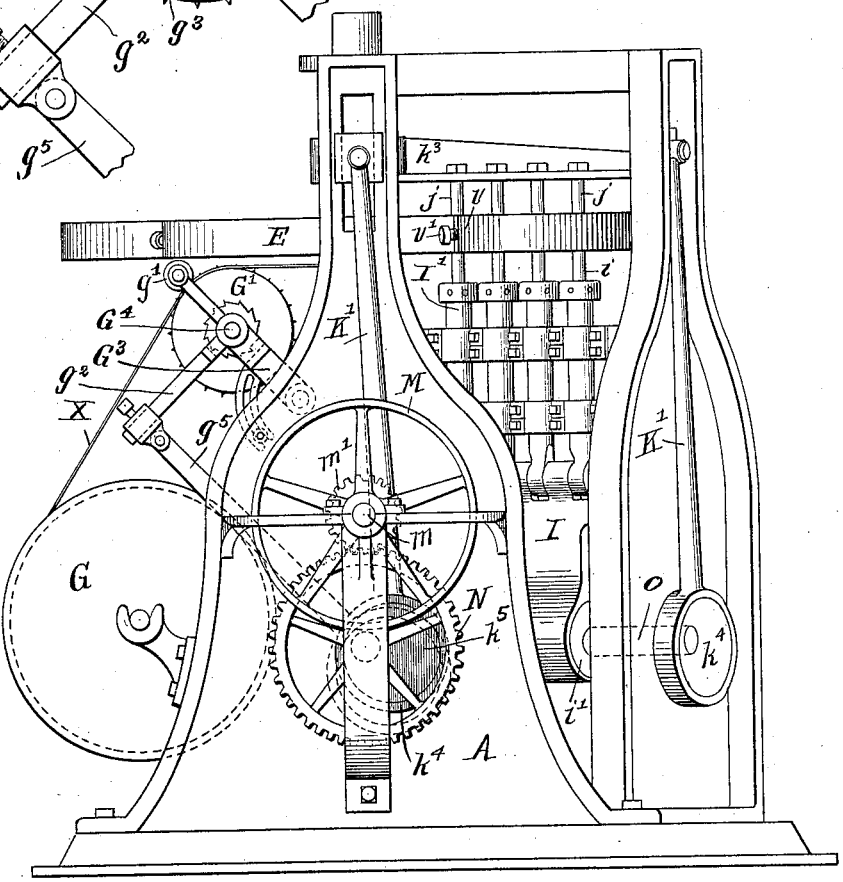
Figure 9:
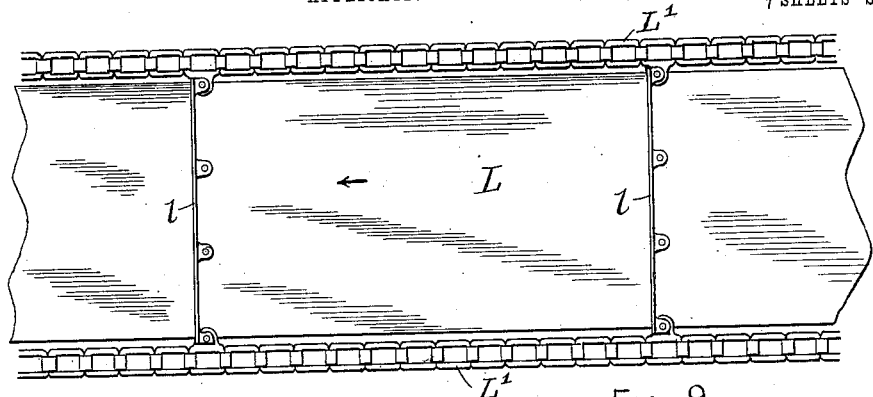
Figure 4:
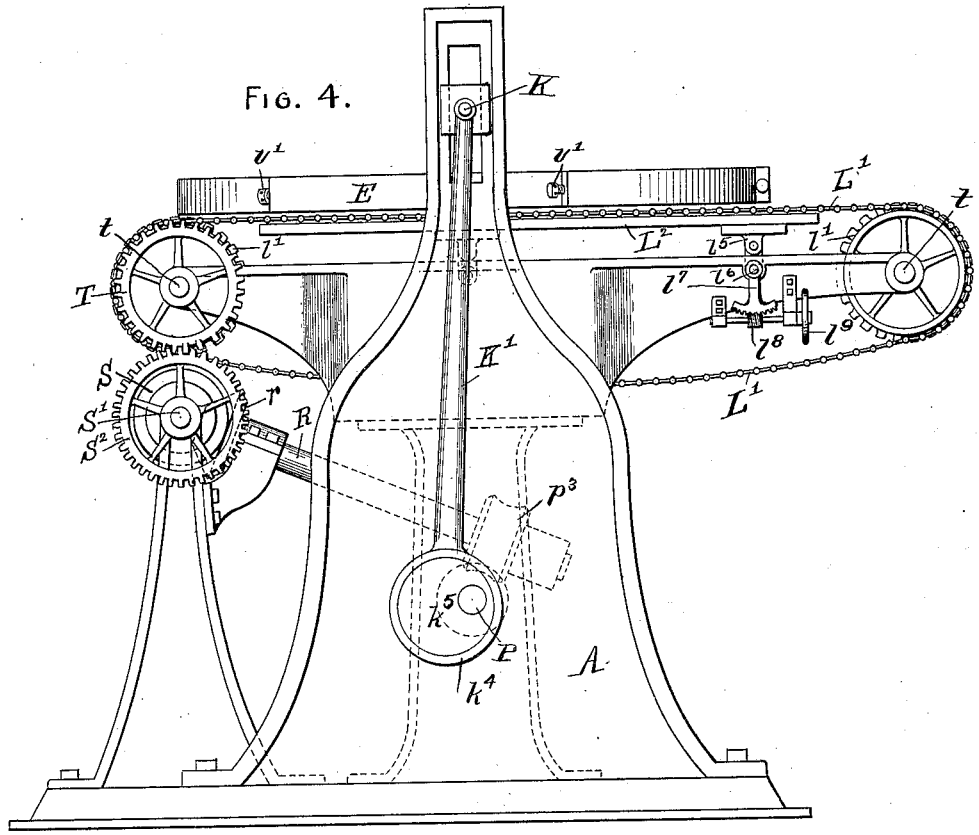
Figure 5:
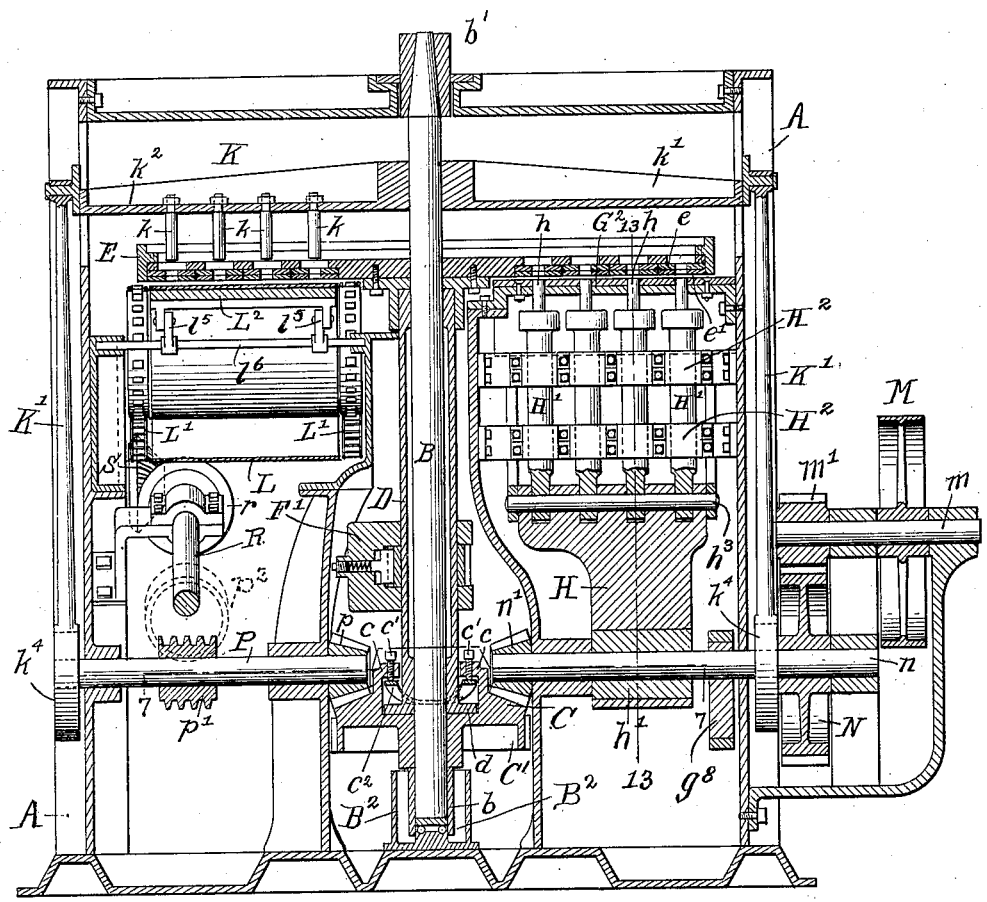
Figure 6:
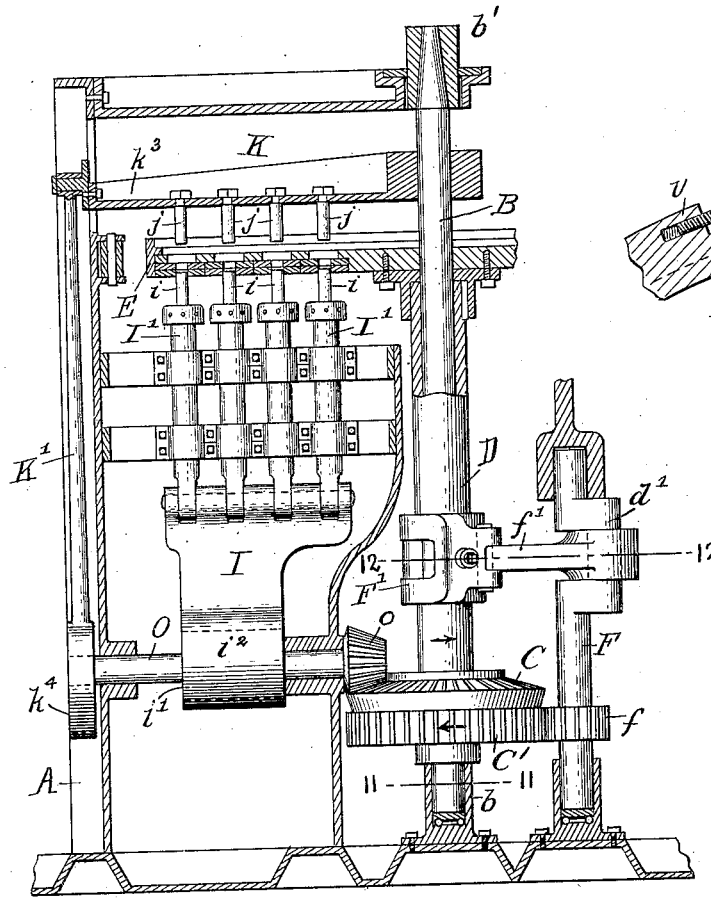
Figure 10:
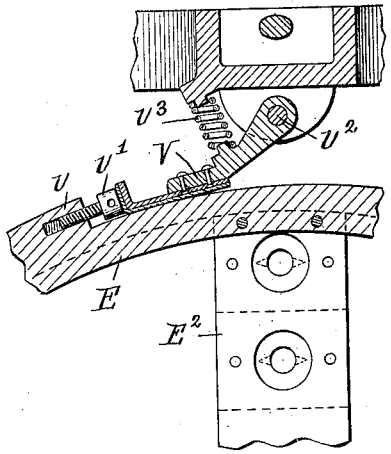
Figure 11:
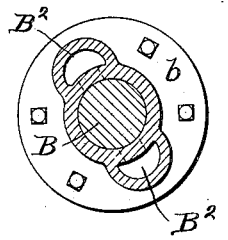
Figure 12:
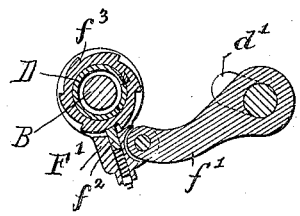

Figure 1, Sheet 1, represents a plan or top view of a machine embodying my improvements, with the upper portion of the frame removed to show the parts beneath more clearly. Fig. 2, Sheet 2, is a view in elevation of the front of the machine. Fig. 3, Sheet 3, is a view in elevation of the right side of the machine, and Fig. 4, Sheet 4, a corresponding view of the left side thereof. Fig. 5, Sheet 5, is a vertical, central section through the machine, on the line 5—5 of Fig. 1. Fig. 6, Sheet 6, is a similar section on the line 6—6 of Fig. 1, showing only that portion behind the central axis of the machine. Fig. 7, Sheet 1, is a horizontal cross-section through a part of the actuating-gear on the line 7—7 of Fig. 5. Fig. 8, Sheet 3, is a vertical section, on an enlarged scale, showing the tag-strip feed-mechanism. Fig. 9, Sheet 4, is a plan view, showing on an enlarged scale, the details of the plug-feeding belt or apron. Fig. 10, Sheet 6, shows a detail sectional view on an enlarged scale, of the stop-motion for the tag-receiver or carrier-wheel. Fig. 11, Sheet 6, is a vertical, transverse section on the line 11—11 of Fig. 6, showing the details of the means for lubricating one of the shafts. Fig. 12, Sheet 6, is a horizontal section on the line 12—12 of Fig. 6, showing the details of the pawl-and-ratchet mechanism actuating the tag-receiver or carrier-wheel. Fig. 13, Sheet 7, is a vertical, transverse section on the line 13—13 of Fig. 5, through one set of dies, cutting-punches, cutter, and their operating mechanism, showing one of the punches and the cutter retracted. Fig. 14, Sheet 7, is a similar view of a portion of the same, showing one of the punches at the forward end of its stroke after having cut out a tag. Fig. 14ª, Sheet 7, is a plan view of one of the die-plates which forms a tag. Fig. 15, Sheet 7, is a sectional detail, showing the position of the dies and the punches which turn the spurs on the tags, before the punches begin their forward movement. Fig. 16, Sheet 7, shows a similar view with one of the punches advanced so as to turn the spurs on a tag, and the head of one of the embossing-punches also advanced. Fig. 16ª, Sheet 7, is a plan view of one of the die-plates, showing the form of the tag after the spurs are bent. Fig. 17, Sheet 7, is a sectional detail showing the relation of the parts which secure the tag to the plug. Fig. 18, Sheet 7, is a detail view in vertical section and on an enlarged scale showing the devices for causing the carrier wheel to return to proper position after having advanced beyond such position. Fig. 18ª shows further details of this mechanism. Fig. 19, Sheet 7, is a detail view of the cutter which severs the strips after the tags have been cut therefrom.

The mechanism is shown as mounted in a stout main frame A. An upright shaft B, turns in suitable bearings $b$, $b'$, in the top and bottom of the frame, (see Fig. 5.) and a combined bevel-wheel C, and spur gear C', is secured on the shaft B, near its lower end. This wheel is driven by a bevel-wheel $n'$, on a shaft $n$, mounted in suitable bearings in the main frame and carrying a spur-wheel N, meshing with a pinion $m'$ on a shaft $m$, carrying a driving pulley M. Lugs $c$, on the wheel C, carry set-screws $c'$, acting on a friction-spring $c^2$, bearing on a flange $d$, on the lower end of a collar or sleeve D, encircling the shaft B. The purpose of these devices will be hereinafter more fully described. The tag-receiver or carrier-wheel E, is secured to the upper end of the sleeve shaft D, and is shown as having six spokes or radial arms $E'$, $E^2$, $E^3$, $E^4$, $E^5$, $E^6$ connected with the horizontal ring E, and moves intermittently from one set of punches to another, as hereinafter described. The sleeve D, is provided with ratchet mechanism illustrated particularly in Figs. 5, 6, and 12. As there shown a ratchet-wheel $f^3$, is attached to the sleeve and this is engaged by a pawl or a dog $f^2$, carried by a swinging frame F'. This frame is connected by means of a pitman $f''$, with a crank $d'$ on a vertical shaft F, which has a pinion $f$, gearing with the spur-wheel C', the wheels and shafts revolving in the directions indicated by the arrows. The wheel C', revolves continuously in the direction indicated and imparts continuous rotation to the shaft F. This shaft F, reciprocates the pawl $f^2$, which engages the six teeth of the ratchet wheel $f^3$, giving it an alternate movement step by step in the same direction. As shown, the ratchet-wheel is turned a complete revolution by six actuations of the pawl, but the arrangement is such that each time that the pawl actuates the ratchet it moves it and consequently the sleeve D, and wheel E, more than sixty degrees, preferably sixty-four degrees, and devices are employed for returning the wheel to the proper position. The purpose of this organization is to prevent the wheel from carrying its dies out of alinement with the punches as it might be apt to do when actuated at a high speed.

The wheel or carrier E, is shown as being formed with six shoulders or off-sets $v$, and each of these shoulders carries an adjusting screw $v'$. On some suitable part of the frame is pivoted at $v^2$, a stop V, (see Fig. 10) which is urged towards the wheel by a spring $v^3$. For security against breakage, this stop has its portion next the wheel made of two parallel pieces arranged side by side and riveted at one end to the body of the stop, the free ends of these pieces being bent at right angles to abut against the set-screw $v'$. The ratchet mechanism, as before described, is arranged to move the carrier-wheel sixty-four degrees at each operation and as one of the shoulders $v$, passes the stop V, the latter falls in behind the stop, then the pawl $f^2$ moves forward to take hold of another tooth on the ratchet wheel at each time the sleeve D, and wheel E, are stationary, but the wheel C', continues to revolve and as this wheel carries a friction spring $c^2$, bearing against the flange $d$, on the sleeve D, the sleeve and consequently the wheel E, is caused to turn with the wheel C, and inasmuch as this wheel turns in the direction opposite to that of the shaft F, the sleeve D, is caused to turn back until this motion is arrested by the stop V. It will thus be seen that while the forward movement of the carrier-wheel is not hindered by the friction devices the carrier is caused to return a few degrees after each actuation and is positively stopped and held in a fixed position, which position is such that the dies which the wheel carries are in exact alinement with the punches which form and apply the tags.

The machine as illustrated is organized to form and apply four tags simultaneously to plugs of tobacco, but the mechanism could of course readily be adapted to form and apply a smaller or larger number of tags. Each of the six arms of the carrier has four tag-receiving and spur-turning dies, and as the operations are intended to be successively continuous, and as the operation of forming and applying the tags takes place during a pause in the operation of the carrier, the latter necessarily moves through sixty degrees of the circle at each step.

Each of the arms on the wheel E, carries sets of dies $e$, $e'$, arranged horizontally and parallel to each other in the manner illustrated in Figs. 13, 14ª and 16ª.

The tags are formed from narrow continuous strips or ribbons of metal X, of indefinite length. These strips are wound on flanged reels or spools G, mounted in bearings on the frame. Each of the strips passes over a corresponding spiked or sprocket-wheel G'. The spurs or spikes of each wheel engage with suitable indentations or perforations formed in one or both of the edges of the strip so as to insure its accurate feed.

The feed-wheels are actuated by pawl and ratchet mechanism illustrated particularly in Fig. 8. As shown, the sprocket wheels $G^7$, are secured on a shaft $G^4$, supported adjustably in arms $G^3$, on the frame. A pawl $g^3$, engages a ratchet-wheel $g^4$, on the shaft, and this pawl is preferably actuated by connections $g^5$, with a cam $g^8$ on the shaft $n$, (see Fig. 5). A pressure-roller or bearing-wheel $g'$, between which and the sprocket-wheel, the tag strip passes, serves to hold each tag-strip down upon its feed-wheel. From these feed-wheels each strip X, passes through the appropriate one of a series of stationary dies $G^2$, secured to the main frame. These dies have openings $g^6$, as shown in Fig. 19, through which the strips pass and they have vertical openings through which the punches operate to cut the tags from the strips. The relative positions of the fixed dies, punches, and the dies $e, e'$, when the tags are being punched from the strips are shown in Figs. 13 and 14. Below the fixed dies $G^2$, are punches $h$, carried by vertically moving plungers $H'$, joined at $h^3$, to an arm H, radiating from an eccentric ring $h^2$, surrounding a cam $h'$, on the shaft $n$. The plungers $H'$, move through guides $H^2$, of the main frame and are operated at proper intervals to cause the punches $h$, to rise and punch the tags from the strips. The fixed dies $G^2$, have a flange $G^6$, to which are attached guides $G^7$, between which and the flange is arranged the vertically reciprocating cutter W. This cutter is connected with rods $W'$, which are secured to the pivot shaft $h^3$, that connect the plungers $H'$, to the arm H. The organization is such that after the punches $h$, have severed tags from the strips, the cutter W, cuts off the scrap metal. In Fig. 1 the strips are shown projecting beyond the fixed dies with the tags removed and when in this condition the cutter operates to sever these projecting portions which, when severed, fall to the floor or into any suitable receptacle.

Fig. 14 shows the relation of the parts after the punches have severed the tags and inserted them in the lower die plates or recesses, $e'$. After this operation takes place the carrier wheel is advanced sixty degrees and the dies $e, e'$, are stopped above and in exact alinement with punches $i$, which are for the purpose of forcing the tags up into the dies $e$, at the same time bending over the spurs until they assume a position at right angles to the body of the tags. The punches $i$, are carried by plungers $I'$, connected with the arm I, of an eccentric ring $i^2$, surrounding an eccentric or cam $i'$, on a shaft O, which has a bevel gear $o$, meshing with the wheel C. When the carrier-wheel has stopped with the tag-blanks in the dies $e'$, over the punches $i$, the latter rise and bend the spurs in the manner illustrated in Fig. 16, causing the tags in this condition to enter the dies $e$. In this condition the tags are ready to be applied to the tobacco, but if it is desired to emboss the tags I may employ embossing punches $j$, operating directly over the punches $i$, and acting upon the tags simultaneously with the punches $i$. These punches $j$, may be secured to one arm of the frame K, hereinafter more fully described. The manner in which the embossing and bending punches coöperate is illustrated in Fig. 16.

After the tags have had their spurs thus bent and are thus embossed, the carrier-wheel is rotated through sixty degrees and pauses while the operations hereinbefore described are repeated upon another set of tags. After this, another forward movement of sixty degrees takes place which transfers the tags in the condition illustrated in Fig. 16, to a position directly over the plugs of tobacco to which the tags are to be applied. This movement of one hundred and twenty instead of sixty degrees between the two operations described, is made for the more convenient operation of the device, as will be readily understood, as the movement of sixty degrees would bring the dies at an angle to the plugs instead of squarely over them as they should be when the tags are applied. When the tags have reached the position last described a series of inserting punches $k$, are forced down through the dies which force the tags from the dies into the plugs of tobacco Z, in the manner illustrated in Fig. 17. The inserting punches $k$, are carried by one of the arms of a frame K, which is movable vertically in the main frame and is guided thereby and also by the shaft B, which extends centrally through this frame. Said frame K, is shown as being formed with three arms $k', k^2, k^3$. Two of the arms $k', k^2$, are arranged in the same plane diametrically opposite to each other, while the third arm $k^3$, is arranged at an angle of sixty degrees to one of the other arms, and one hundred and twenty degrees with reference to the other. The frame is raised and lowered at proper intervals by means of pitmen $K'$, connected to the outer ends of the arms of the frame K, and having eccentric strips $k^4$, at their lower ends encircling cams or eccentrics $k^5$, attached to the shafts $n$, O and P. As the frame K, is raised and lowered the punches $j$, and $k$, are correspondingly raised and lowered at proper intervals.

The plug-feeding mechanism is shown as consisting of an endless belt L, which may be of rubber, leather, canvas, or other suitable material, with driving chains $L'$, secured on each side thereof which traverse sprocket wheels $l', l'$, mounted in suitable bearings in the frame. Cross-bars $l$, extend across the belt, connect the chains, and keep the apron flat. The cross-bars $l$, are made about the thickness of a plug of tobacco and are arranged about as far apart as the ordinary length desired for the plugs which are laid on the belt side by side with their rear ends abutting against the cross bars, and they are carried forward with the belt which moves over a table L², provided with means for raising and lowering it to accommodate different thicknesses of tobacco. Any suitable means for adjusting the table vertically may be employed. As shown, the table is supported at each end by links $l^5$, attached to shafts $l^6$. One of the shafts has attached to it a segment $l^7$, (see Fig. 4), the teeth of which gear with a worm $l^8$, which may be operated by a hand wheel $l^9$. By suitably operating this hand wheel the table may be raised or lowered to any desired extent. The carrier belt is operated by mechanism next to be described.

The shaft P, which turns in suitable bearings in the frame, carries on its inner end a bevel gear $p$, meshing with the bevel gear C, before described. A worm gear $p'$, on this shaft engages with a corresponding gear $p^3$, on an inclined shaft R, carrying a miter gear $r$, which gears with a corresponding miter gear S, on a stud shaft S', carrying a spur gear S², meshing with a corresponding gear T, on one of the shafts $t$. By this gearing a proper movement is given to the carrier belt to feed the plugs of tobacco beneath the tag-applying mechanism.

The operation of the machine will be clear from the foregoing description. It will be understood that instead of employing six radial arms to receive and carry the tags, a larger or less number may be employed and each arm may carry a greater or less number of dies and the plungers may be varied in number to accommodate changes in the numbers of the dies. After the machine is set in operation one set of dies may be receiving tags while another is having the spurs of the tags bent and a third is having the tags discharged and applied to the plugs. The mechanism is all nicely timed so that the several parts work harmoniously, the tag strips being fed in proper time relatively to the speed of the tag cutting punches, while the plungers for turning the spurs, embossing the tags and inserting them into the plugs also operate harmoniously with the rest of the mechanism. The cutter also is arranged to operate to shear off the surplus metal from the tags just after the tag-cutting punches have operated. No special devices are required to hold the tags in the dies $e$, while they are being carried from one set of punches to another as the elasticity of the metal is sufficient to hold the tags in such positions. It will be observed that the plug-carrier moves in opposite direction to that of the tag-carrying wheel and thus time is gained in doing the work.

I have stated that the tag strips are perforated, but, obviously, indentations might be made instead of perforations, and where I specify perforations in the claims I intend to include also corresponding indentations.

Any suitable means may be used for lubricating the bearings. In Fig. 11, I have shown the bearing at the end of the shaft B, as being lubricated by means of channels B², formed in the casing at the lower end of the shaft B. This detail, however, is not essential, and many other details are illustrated which are not essential to the mechanism for carrying out my invention. The machine illustrated, however, is complete and efficient and embodies the best way now known to me of carrying out my invention.

I claim as my invention:

1. In a machine for cutting tags from a strip printed with a series of tag designs arranged uniformly and at regular intervals, the combination of a punching device for cutting out the tags successively from the strip and for turning the spurs thereof, tag-strip feeding devices, means for actuating the punching device, means for actuating the tag-strip feeding devices to cause the strip to be fed at such speed relatively to the speed of the punches that successive tags are accurately cut by the punches a tobacco carrier, means for advancing it step-by-step, and means for pressing the tags into the tobacco.

2. In a machine for cutting tags from strips each printed with a series of tag designs and having a longitudinal series of perforations arranged at regular intervals corresponding with the tag designs, the combination of a series of simultaneously operating punches for cutting out tags successively from each strip and simultaneously from the several strips, a series of sprocket wheels having teeth accurately spaced to successively engage the successive perforations in the several strips, means for simultaneously actuating the several punches and the several sprocket wheels to cause the strips to be fed simultaneously and coincidently at such speed relatively to the speed of the punches that successive tags will be accurately cut from the strips without marring the designs a tobacco carrier and means for advancing it step by step to present tobacco to receive the tags.

3. In a machine for cutting tags from strips printed with a series of tag designs and having a longitudinal series of perforations arranged at intervals corresponding with the tag designs, the combination of a series of fixed dies through which the strips are automatically fed, a carrier which receives the tags from the dies, a series of simultaneously operated punches coöperating with the dies for cutting tags successively from each strip and simultaneously from the several strips, a series of sprocket wheels having teeth accurately spaced to successively engage the successive perforations in the several strips, a shaft to which said sprocket wheels are secured, ratchet mechanism for operating said shaft to simultaneously and coincidently actuate the sprocket wheels, means for operating the punches at such speed relatively to the speed of the sprocket wheels that successive tags will be accurately cut from the strips without marring the designs a tobacco carrier and means for advancing it step by step to present tobacco to receive the tags.

4. In a machine for cutting tags from strips printed with a series of tag designs and each having a longitudinal series of uniformly spaced perforations, the combination of a series of flanged reels adapted to carry the strips, a series of sprocket wheels each having teeth which successively engage the successive perforations of its respective strip, a bearing wheel for each strip, means for actuating the sprocket wheel to feed the strips a tobacco carrier and means for advancing it step by step to present tobacco to receive the tags.

5. In a machine for cutting tags from strips printed with a series of tag designs and each having a longitudinal series of uniformly spaced perforations, the combination with a series of punches, of a series of sprocket wheels each having teeth adapted to successively engage the successive perforations in the strips, bearing wheels for pressing the strips into engagement with the sprocket wheels, means for rotating the sprocket wheels simultaneously and coincidently, means for actuating the punches at such speed relatively to the speed of the sprocket wheels that tags will be simultaneously and accurately cut from the series of tag-strips fed by the wheels a tobacco carrier and means for advancing it step by step to present tobacco to receive the tags.

6. The combination of a series of sprocket wheels, each having teeth successively engaging successive perforations in a tag strip, means for simultaneously and coincidently rotating said sprocket wheels, a series of dies to which the strips are fed by the wheels, a series of punches coöperating with the dies to cut tags from the strips, a cutter for severing surplus metal from the strips after the tags are cut therefrom, a rotary carrier which receives the tags from the dies a tobacco carrier and means for advancing it step by step to present tobacco to receive the tags.

7. In a machine for cutting tags from a strip printed with a series of tag designs and having a longitudinal series of uniformly spaced perforations, and for applying said tags to tobacco the combination of a fixed die, mechanism for accurately feeding the tag-strip step-by-step to the die, a rotary carrier revolving about a vertical axis and having a tag receiving recess and a spur turning die, a punch for cutting a tag from the strip and forcing it into the tag receiving recess, another punch for forcing the tag into the spur turning die, a punch for forcing the completed tag from its recess, and a tobacco carrier which moves the tobacco forwards to receive the tag from the carrier, and means for advancing the tag carrier.

8. In a machine for cutting tags from strips printed with series of tag designs arranged uniformly and at regular intervals, the combination of a series of fixed dies, mechanism for simultaneously and accurately feeding the strips to the dies, a rotary carrier having tag receiving recesses and spur turning dies, a series of simultaneously operated punches for simultaneously cutting tags from the several strips and for forcing them upwardly into the tag receiving recesses in the carrier, other upwardly moving punches for forcing the tags into the spur turning dies, downwardly moving punches for simultaneously forcing the completed tags from the carrier, a tobacco carrier which moves the tobacco under the tag carrier to receive the tags therefrom, means for advancing the tag carrier and mechanism for operating the punches correspondingly with the feed mechanism to accurately cut tags fed thereby.

9. In a machine for forming and applying tags to tobacco, the combination of a fixed die, means for feeding a tag strip thereto, a carrier revolving about a vertical axis which receives the tags from the die, a punch for cutting a tag from the strip and forcing it into the carrier, a cutter moving coincidently with the punch for severing from the strip that part of the strip from which a tag has been punched a tobacco carrier and means for advancing it step by step to present tobacco to receive the tags.

10. In a machine for forming and applying tags to tobacco, the combination of a series of fixed dies, means for simultaneously and coincidently feeding a series of tag strips thereto, a carrier having recesses for receiving the tags from the dies, a series of punches operating simultaneously to cut tags from the several strips and force them into the recesses of the carrier, a single cutter movable simultaneously with the punches for severing from the strips those portions thereof from which the tags have been punched a tobacco carrier and means for advancing it step by step to present tobacco to receive the tags.

11. The combination of a sprocket wheel having teeth engaging a longitudinally perforated tag strip, a fixed die through which the strip is fed by the sprocket wheel, a carrier moving intermittently over the fixed die, a punch which cuts a tag from the strip and forces it into engagement with the carrier, a knife which cuts off the end of the punched tag strip, means for actuating the strip, the carrier, the punch, and the knife a tobacco carrier and means for advancing it step by step to present tobacco to receive the tags.

12. The combination of a tag carrier having tag receiving recesses, spur dies in the carrier, punches for forcing the tags from the recesses in the carrier into the spur dies to turn the spurs into proper position, and punches for embossing the tags.

13. The combination of a tag carrier having tag receiving recesses and spur dies, punches for cutting out tags and inserting them into said recesses, other punches which force the tags into the spur dies to turn the spurs into proper position, a third set of punches for driving the tags from the recesses in the carrier into the tobacco, and punches for embossing the tags.

14. The combination of a tag carrier having a tag receiving recess, a spur die and two punches, one of which forces the tag from the receiving recess into the spur die to turn up the spurs, while the other punch simultaneously acts upon the opposite side of the tag to emboss it.

15. The combination of a fixed die through which a tag strip passes, a tag carrier having a tag receiving recess therein, a punch which cuts out the tag and forces it into said recess, a spur die coincident with the tag receiving recess, a punch which forces the tag into the spur die, an embossing punch, and means for actuating them.

16. A tag carrier comprising a series of radial arms or spokes, each having a series of tag receiving recesses and a series of coincident spur dies, means for rotating the carrier intermittently, means for holding the carrier in a fixed position after each actuation, punches for cutting out tags and inserting them into the recesses, other punches for forcing the tags into the spur turning dies, and a third set of punches for forcing the tags from the dies into the tobacco.

17. In a machine for cutting tags from strips printed with tag designs arranged uniformly and at regular intervals, the combination of tag-strip feeding mechanism, means for actuating it to cause the strips to be fed uniformly and to the same extent at each operation, an intermittently moving carrier provided with a series of arms, each of which has a series of tag receiving recesses, and a series of spur forming dies corresponding with the fixed dies, a series of punches for cutting tags from the strips and forcing them into the recesses of the carrier, another set of punches for turning the spurs, mechanism for advancing the carrier from the tag cutting punches into proper relation with the spur turning punches, a third set of punches for inserting the tags into the tobacco, means for advancing the carrier from the spur turning punches to the tag inserting punches and a tobacco carrier advancing step-by-step to meet the tag inserting punches.

18. A tobacco plug feeder, comprising an endless apron, a sprocket chain on each longitudinal edge thereof, cross bars secured to the apron at proper intervals to receive the plugs, a table over which the apron travels, sprocket wheels traversed by the chains and means for adjusting the table vertically to accommodate different thicknesses of plugs.

19. The combination of a tag cutting, spur turning, and tag applying devices movable in a fixed path, a tag carrier, means for moving the carrier a definite distance at each operation, means for retracting the carrier into alinement with the punches, and means for locking the carrier in position while the punches are in operation.

20. The combination of a series of die carrying arms, an encircling ring, means for rotating the ring intermittently more than the distance required, means for retracting the carrier into proper position, and means for holding the carrier in a fixed position.

21. The combination of a series of intermittently rotating arms adapted to carry tags from the tag forming to the tag applying mechanism, stops which limit the backward movement of the arms, adjusting devices therefor, means for rotating the carrier a definite distance, and means for retracting the carrier against the stops.

22. The combination of a tag applying punch, a tag carrier, means for supplying tags thereto, means for rotating the carrier through a part of a complete revolution, and means for retracting the carrier to bring the tag into alinement with the tag applying punch.

23. The combination of a tag applying punch, a tag carrier, means for supplying tags thereto, a sleeve to which the tag carrier is attached, pawl and ratchet mechanism for actuating the sleeve to turn the carrier at each operation part of a complete revolution to carry the tag past the tag applying punch, a continuously rotating wheel normally turning in an opposite direction to that of the sleeve, and friction devices connecting the sleeve with the wheel whereby the sleeve is at times turned with said wheel to retract the carrier and bring the tag into alinement with the punch.

24. The combination of a rotary tag carrier formed on its periphery with shoulders carrying adjusting screws, a spring pressed stop carried by the main frame of the machine and adapted to engage said shoulders, means for rotating the carrier step by step to cause the shoulders to pass the stop, and means for retracting the shoulders against the stop substantially as described.

25. The combination of a series of die carrying arms moving intermittently between a series of cutting and of spur turning punches on one side of the carrier arms, and a series of embossing and tag applying punches on the opposite side to cut, form, emboss, and apply the tags to plugs of tobacco simultaneously and successively.

26. The combination with an intermittently rotating tag carrier, of embossing and tag applying punches mounted in a common frame reciprocating transversely to the line of movement of the tag carrier to simultaneously emboss one set of tags and apply another set to plugs of tobacco.

In testimony whereof, I have hereunto subscribed my name.

WHITLEY E. MARTIN.

Witnesses:
F. C. MERNING,
G. M. DAVIS.